(12) United States Patent
Robertson et al.

(10) Patent No.: US 9,151,181 B2
(45) Date of Patent: Oct. 6, 2015

(54) METALLIC RAILS ON COMPOSITE FAN CASE

(75) Inventors: Thomas J. Robertson, Glastonbury, CT (US); Darin S. Lussier, Berlin, CT (US); Mark W. Costa, Storrs, CT (US)

(73) Assignee: United Technologies Corporation, Hartford, CT (US)

( * ) Notice: Subject to any disclaimer, the term of this patent is extended or adjusted under 35 U.S.C. 154(b) by 712 days.

(21) Appl. No.: 13/526,627

(22) Filed: Jun. 19, 2012

(65) Prior Publication Data

US 2013/0336773 A1    Dec. 19, 2013

(51) Int. Cl.
*F01D 25/24* (2006.01)
*F01D 25/00* (2006.01)

(52) U.S. Cl.
CPC .............. *F01D 25/24* (2013.01); *F01D 25/005* (2013.01); *F05D 2300/501* (2013.01); *F05D 2300/603* (2013.01); *Y02T 50/672* (2013.01); *Y10T 29/49982* (2015.01)

(58) Field of Classification Search
CPC ....... F01D 25/005; F01D 25/14; F01D 25/24; F01D 25/243; F01D 25/285; F01D 25/28; F04D 29/403; F04D 29/522; F05B 2280/6003
USPC ........................................... 415/213.1, 214.1
See application file for complete search history.

(56) References Cited

U.S. PATENT DOCUMENTS

| | | | |
|---|---|---|---|
| 4,266,741 A | 5/1981 | Murphy | |
| 5,180,281 A | 1/1993 | Burge et al. | |
| 5,403,148 A * | 4/1995 | Forrester | 415/9 |
| 5,408,826 A | 4/1995 | Stewart et al. | |
| 6,123,170 A * | 9/2000 | Porte et al. | 181/214 |
| 6,364,524 B1 * | 4/2002 | Markham | 374/131 |
| 6,983,603 B2 * | 1/2006 | Macchia | 60/772 |
| 7,010,906 B2 | 3/2006 | Cazenave et al. | |
| 7,267,301 B2 | 9/2007 | Dron | |
| 7,871,486 B2 | 1/2011 | Xie et al. | |
| 8,021,102 B2 | 9/2011 | Xie et al. | |
| 8,057,171 B2 | 11/2011 | Evans | |
| 8,092,169 B2 | 1/2012 | Cloft et al. | |
| 2008/0276621 A1 * | 11/2008 | Somanath et al. | 60/796 |
| 2009/0293497 A1 | 12/2009 | Cloft | |
| 2010/0189552 A1 | 7/2010 | Evans | |
| 2010/0260602 A1 | 10/2010 | Binks et al. | |
| 2011/0138769 A1 | 6/2011 | Costa et al. | |
| 2012/0076647 A1 | 3/2012 | Robertson, Jr. et al. | |
| 2013/0192749 A1 * | 8/2013 | Wiles | 156/242 |

FOREIGN PATENT DOCUMENTS

EP    2447157 A2    5/2012

OTHER PUBLICATIONS

The International Search Report mailed Jul. 26, 2013 for International Application No. PCT/US2013/042444.

* cited by examiner

*Primary Examiner* — Edward Look
*Assistant Examiner* — Danielle M Christensen
(74) *Attorney, Agent, or Firm* — Kinney & Lange, P.A.

(57) ABSTRACT

A composite fan case has a generally cylindrical composite shell, at least one band of sacrificial composite material circumscribing an outer surface of the composite shell, and a metallic rail mounted on the band of sacrificial material. Also disclosed is a method of construction the aforementioned case.

13 Claims, 3 Drawing Sheets

METALLIC RAILS ON COMPOSITE FAN CASE

BACKGROUND

The disclosure herein relates to structures and methods for making structures having metallic rails about a composite structure. More specifically, the disclosure describes methods for making composite fan cases having a metallic rail disposed thereabout.

In gas turbine engines, such as aircraft engines, air is drawn into the front of the engine, compressed by a shaft-mounted compressor, and mixed with fuel in a combustor. The mixture is then burned and the hot exhaust gases are passed through a turbine mounted on the same shaft. The flow of combustion gas expands through the turbine which in turn spins the shaft and provides power to the compressor. The hot exhaust gases are further expanded through nozzles at the back of the engine, generating powerful thrust, which drives the aircraft forward.

Because engines operate in a variety of conditions, foreign objects may undesirably enter the engine. More specifically, foreign objects, such as large birds, hailstones, sand and rain may be entrained in the inlet of the engine. As a result, these foreign objects may impact a fan blade and cause a portion of the impacted blade to be torn loose from the rotor, which is commonly known as fan blade out. The loose fan blade may then impact the interior of the fan casing causing a portion of the casing to bulge or deflect. This deformation of the casing may result in increased stresses along the entire circumference of the engine casing.

In recent years composite materials have become increasingly popular for use in a variety of aerospace applications because of their durability and relative lightweight. Although composite materials can provide superior strength and weight properties, and can lessen the extent of damage to the fan casing during impacts such as blade outs, designing cases that are capable of both withstanding internal impacts, as well as supporting hardware mounted on the external surface.

Laminated composite structures generally have superior strength in-plane due to the presence of continuous reinforcing fibers. However, issues may arise when attaching a secondary structure about the body of the composite structure, as opposed to about an end of the composite structure. Secondary structures and instrumentation are often utilized during the design and testing of an engine, and must be attached to the composite fan case. Drilling of additional holes in a composite fan case is undesirable as this weakens the structure at the point of the aperture. Alternately, using a metallic fan case to support the additional external testing hardware allows for adequate support, but the case does not maintain the same lightweight properties as a composite structure. Thus, there exists a need for composite fan case structure capable of withstanding both internal and external forces.

SUMMARY

In a first embodiment, a composite fan case has a generally cylindrical composite shell, at least one band of sacrificial composite material circumscribing an outer surface of the composite shell, and a metallic rail mounted on the band of sacrificial material.

In an alternate embodiment, a method of manufacturing a composite fan case includes the steps of fabricating a generally cylindrical case with a plurality of composite layers, forming a band of sacrificial composite material on the outer surface of the case, and attaching a metallic rail to the band.

DETAILED DESCRIPTION

Figure 1:
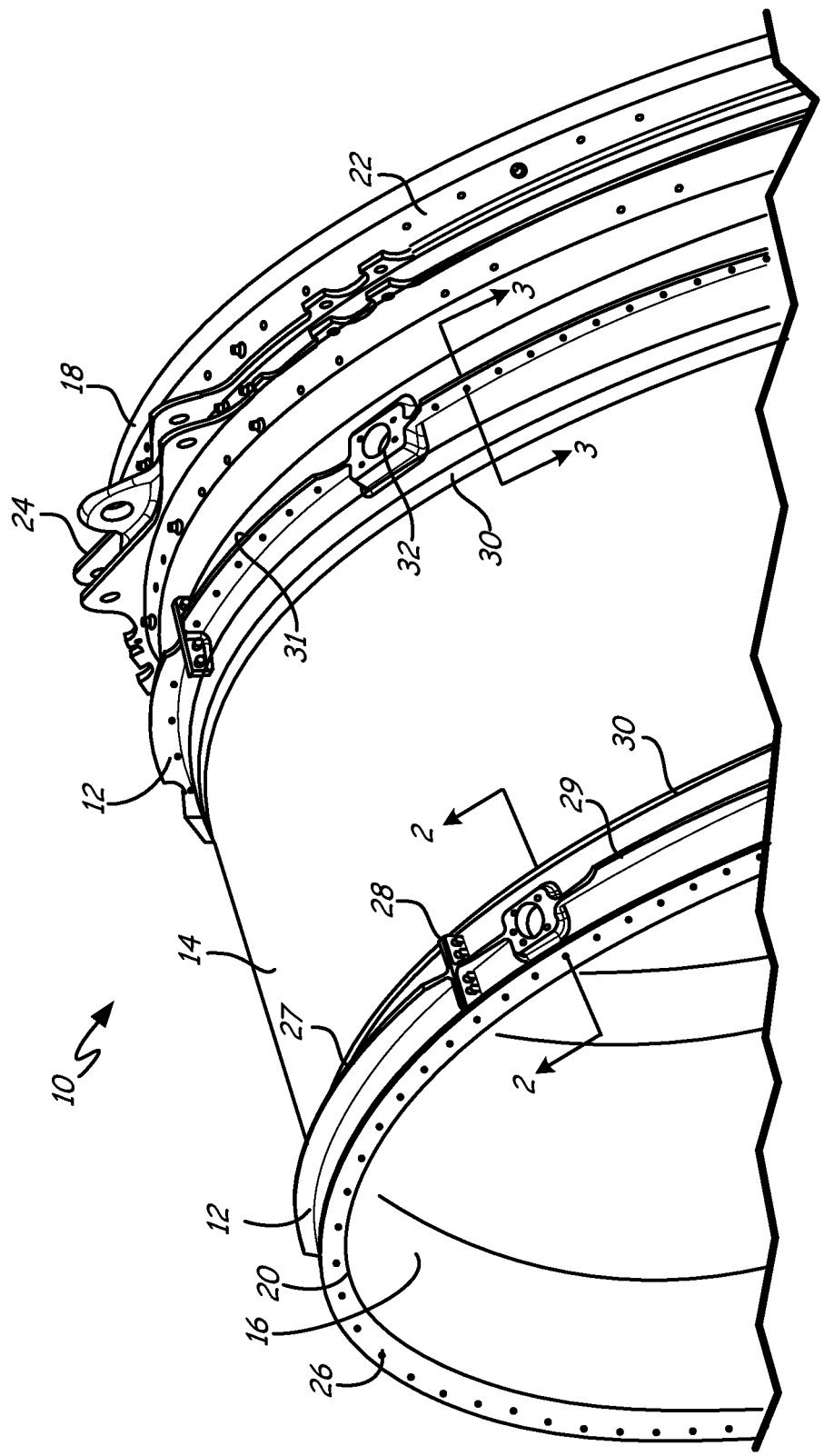
FIG. 1 is a perspective view of a composite fan case with metallic rails mounted thereto.

FIG. 1 is a perspective view of a composite fan case assembly 10 with metallic rails 12 mounted thereto. Composite fan case assembly 10 includes a generally cylindrically shaped fan case shell 14 that extends between an open front end 16 and an open rear end 18. In addition, composite fan case may have one or more of the following secured to the inner surface: a flowpath liner with or without acoustic treatment, an abradable rub strip, an ice shield, a face sheet, a penetrable containment covering, or any combination thereof. Fan case 14 is fabricated from a plurality of non-metallic composite layers. In one embodiment, fan case 14 is fabricated from a composite material, such as, but not limited to, glass fibers, graphite fibers, carbon fibers, ceramic fibers, aramid fibers, and/or combinations thereof. Fan case 14 may be fabricated using any acceptable fabrication method known to those skilled in the art.

The front end 16 includes an attachment flange 20 that is formed of the plurality of composite layers. A metallic backing may be secured to the attachment flange 20 to provide additional strength and support for mounting of fan case 14 within a gas turbine engine. Attachment flange 20 includes apertures 26 that extend through attachment flange 20. Apertures 26 are provided for the fasteners (not shown) utilized for securing composite fan case 10 to the nacelle of the gas turbine engine and for mounting secondary features (not shown).

Open rear end 18 of fan case 14 does not include an attachment flange, and is secured to the nacelle structure using other attachment and securing methods. Open rear end 18 contains attachment ring 22, which in one embodiment is a metal ring integrally fabricated as part of composite fan case 10. In an alternate embodiment, ring 22 is secured with a series of fasteners that extend between ring 22 and fan case 14. Attachment ring 22 may contain additional mounting flanges 24 secured thereto for securing the composite fan case 10 to the gas turbine engine and secondary features.

In the embodiment illustrated, composite fan case 10 contains two metallic rails 12 attached thereto. Rails 12 are constructed from a light weight metal or alloy, such as aluminum. Rails 12 are split rails, i.e., composed of a plurality of pieces 27, 29 secured together at a joint 28 with fasteners. Rails 12 contain various features for mounting testing instrumentation to the gas turbine engine, such as flange 31 and probe holder 32 that will be replaced with a probe (not illustrated). Rails 12 are placed upon multiple layers of additional composite material 30.

Figure 2:
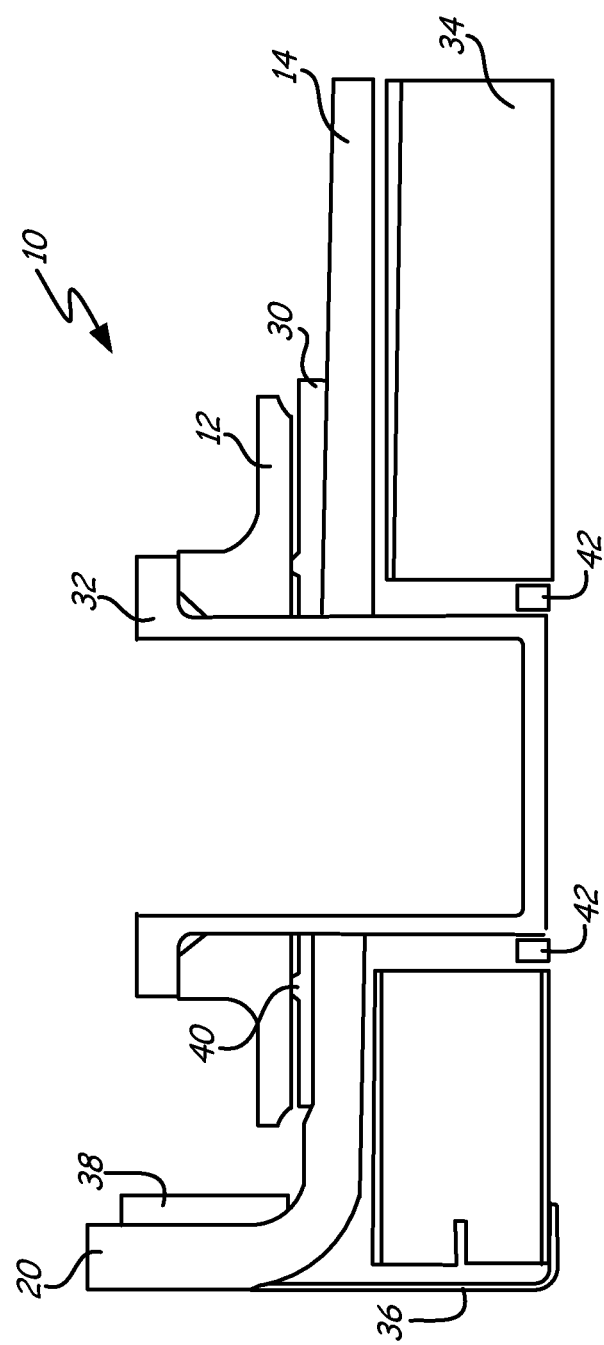
FIG. 2 is a cross-sectional view taken from line 2-2 in FIG. 1.

FIG. 2 is a cross-section of FIG. 1 taken along line 2-2. Illustrated in FIG. 2 are fan case 14, attachment flange 20, and rail 12 on composite layer 30. In this embodiment, composite fan case 10 includes acoustic liner 34 secured to fan case 14 via closeout panels 36. Acoustic liner 34 is bonded to an aluminum honeycomb core, and has one or more layers including an ice shield, face sheet, abradable rub strip, or any combination thereof. Attachment flange 20 is reinforced with metallic ring 38, which is fabricated from aluminum or another lightweight metal or metal alloy such as titanium, and mounted on the axially rearward facing surface of attachment flange 20.

Composite layer 30 is an additional build up of material, such as fiberglass, radially disposed outward of the containment case 14. Composite layer 30 is formed during manufacture of composite fan case 10. As illustrated, composite layer 30 may contain slight accumulations of material in the form of bump 40. This maintains a controlled gap between composite layer 30 and rail 12. Composite layer 30 reinforces fan case 14, which allows for the drilling of a hole to place an instrument guide, such as probe holder 32. With the illustrated configuration, a probe may be inserted through fan case 14 to obtain necessary readings during operation of the engine. The hole for probe holder 32 may be drilled oversized to allow for assembly tolerances. As such, seal 42 is provided to secure probe holder 32. Seal 42 may be an elastomeric adhesive, foam adhesive, silicon, rubber, or any similarly resilient material.

Figure 3:
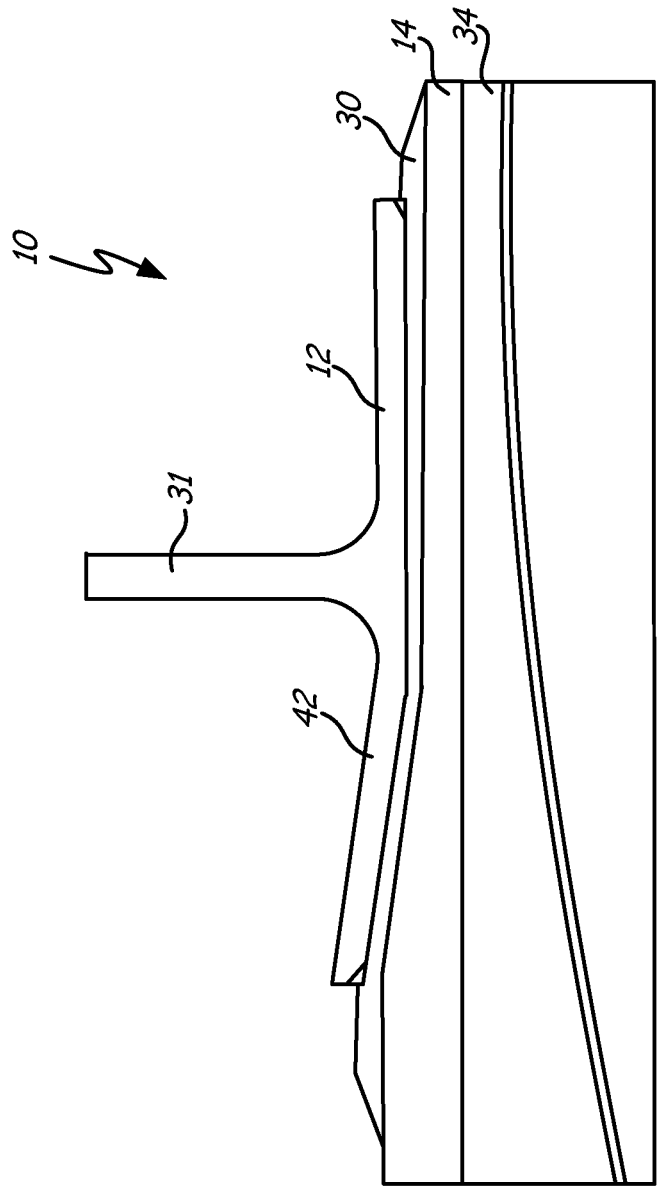
FIG. 3 is a cross-sectional view taken from line 3-3 in FIG. 1.

FIG. 3 is a cross-section of FIG. 1 taken along line 3-3. Illustrated in FIG. 3 are fan case 14 and rail 12 on composite layer 30. Again, composite fan case 10 includes flowpath liner 34 that may be bonded to an aluminum honeycomb core, and have one or more layers including an ice shield, face sheet, abradable rub strip, or any combination thereof. Composite layer 30 is an additional build of material, such as fiberglass. Composite layer 30 is formed during manufacture of composite fan case 10, and follows the contour of the outer surface of fan case 14. Rail 12 contains flange 31 extending from base 40, which is supported by composite layer 30. As illustrated, the contour of fan case 14 and composite layer 30 may be utilized to position base 42 at a required axial location. Flange 31 may contain apertures for the mounting of additional testing hardware for obtaining various reading of the gas turbine engine during its operation. Such hardware may include electrical boxes, instrumentation trays, harness brackets, and the like.

Composite layer 30 may be fabricated during the original manufacturing of composite fan case 10, or may be later added to fan case 14 in a subsequent manufacturing process. Either way, the base composite fan case 10 should be one built to specifications. Composite layer 30 provides localized strengthening, particularly around any apertures required to pass instruments through fan case 14. Composite layer 30 is constructed from the same or similar material as the composite material of composite fan case 10. Composite layer 30 may be a single band of material, or may be formed from multiple segments.

Utilizing a split rail design for rails 12 adds several benefits. The rails allow for the minimization of holes through fan case 14 and ease of installation, while still providing adequate support and structure for mounting required instrumentation. Rails 12 should be thermally compliant, such as through the use of a resilient adhesive material between the rail and fan case 14, as a mismatch between the stresses on the composite fan case from the rails could cause excessive hoop stress is not designed properly. This is due to the low coefficient of thermal expansion of the composite material compared to that of aluminum and other metals. At cold temperatures, the aluminum rail on the exterior of the fan case contracts, and could apply a compressive load on the composite case. By supplying the split rail and resilient material design that can account for expansion/contraction at joints, the system will not affect performance of the gas turbine engine. The adhesive joint allows the rings to be secured without the use of any radially disposed bolts through the fan case 14.

The previously described structure can be utilized in a method for creating a composite fan case. First, a composite fan case shell is provided. To this, a sacrificial layer of composite material, such as fiberglass, is applied. The application is done in bands that circumscribe the outer surface of the shell. The sacrificial layer may be secondarily bonded or co-cured to the shell using an oven cure or autoclave process. The bands of sacrificial material are then machined to provide a controlled mounting surface for the metallic split rails. Surface features, such as bumps, may be added to the outer surface to provide controlled bond thickness for the rail. This creates a nominal gap to allow for thermal growth and contraction so as to not overload the case.

The rails are then installed on the outside of the shell. The joints are secured with fasteners. A bonding agent, such as an elastomeric adhesive like polysulfide may be utilized between the rail and the sacrificial layer. The elastomeric material allows thermal expansion and contraction of the rail rings relative to the fan case without overloading the fan case while minimizing the number of through holes in the case. The alternate to adhesive materials is bolting the rails to the fan case with through holes, thus potentially compromising the structural integrity of the case shell.

After installation of the rails, instrumentation provisions are machined, if necessary (such as probe holder 32 of FIG. 2), which minimizes tolerance build up from surface variations in the case shell. The flanges of the rails may be used for mounting external features along with the required instrumentation. The rails may also contain features such as scalloping to reduce stiffness and reduce the associated weight of the rail. Metallic rails are preferred as composite rails have differing structural concerns.

Discussion of Possible Embodiments

The following are non-exclusive descriptions of possible embodiments of the present invention.

A composite fan case has a generally cylindrical composite shell, at least one band of sacrificial composite material circumscribing an outer surface of the composite shell, and a metallic rail mounted on the band of sacrificial material.

The composite fan case of the preceding paragraph can optionally include, additionally and/or alternatively any one or more of the following features, configurations, and/or additional components:

a layer of resilient material between the band and metallic rail;

the resilient material is polysulfide;

the band of sacrificial composite material contains a feature on the exterior surface to create a nominal gap between the metallic rail and band;

the metallic rail is a split rail comprising a plurality of arcuate sections, each arcuate section containing a flange at each end, and a plurality of fasteners to join the flanges of adjacent arcuate sections;

each rail contains a radial flange extending from a base;

the radial flange is scalloped, and contains at least one aperture;

the at least one band comprises a plurality of segments; and/or at least one aperture extending between the composite shell, band of sacrificial composite material, and metallic rail.

A method of manufacturing a composite fan case includes the steps of fabricating a generally cylindrical case with a plurality of composite layers, forming a band of sacrificial composite material on the outer surface of the case, and attaching a metallic rail to the band.

The method of the preceding paragraph can optionally include, additionally and/or alternatively any one or more of the following features, configurations, steps, and/or additional components:

machining the band of sacrificial composite material to obtain a uniform thickness about the circumference of the case;

machining a surface feature into the band;

drilling a hole through an aperture in the metallic rail, the hole extending through the band and case;

inserting and instrument guide into the hole;

securing the instrument guide with a seal;

applying a layer of elastomeric adhesive to the band.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A composite fan case comprising:
    a generally cylindrical composite shell;
    at least one band of sacrificial composite material circumscribing an outer surface of the composite shell; and
    a metallic rail mounted on the band of sacrificial material;
    wherein the band of sacrificial composite material contains a feature on the exterior surface to create a minimum gap between the metallic rail and band.

2. The composite fan case of claim 1 further comprising:
    a layer of resilient material between the band and metallic rail.

3. The composite fan case of claim 2 wherein the resilient material is polysulfide.

4. The composite fan case of claim 1 wherein the metallic rail is a split rail comprising a plurality of arcuate sections, each arcuate section containing a flange at each end, and a plurality of fasteners to join the flanges of adjacent arcuate sections.

5. The composite fan case of claim 4, wherein each rail contains a radial flange extending from a base.

6. The composite fan case of claim 5, wherein the radial flange is scalloped, and contains at least one aperture.

7. The composite fan case of claim 1 further comprising:
    at least one aperture extending between the composite shell, band of sacrificial composite material, and metallic rail.

8. The composite fan case of claim 1 wherein the at least one band comprises a plurality of segments.

9. A method of manufacturing a composite fan case comprising:
    fabricating a generally cylindrical case with a plurality of composite layers;
    forming a band of sacrificial composite material on the outer surface of the case;
    attaching a metallic rail to the band;
    drilling a hole through an aperture in the metallic rail, the hole extending through the band and case; and
    inserting an instrument guide into the hole.

10. The method of claim 9 further comprising:
    machining the band of sacrificial composite material to obtain a uniform thickness about the circumference of the case.

11. The method of claim 9 further comprising:
    machining a surface feature into the band.

12. The method of claim 9 further comprising:
    securing the instrument guide with a seal.

13. The method of claim 9 further comprising:
    applying a layer of elastomeric adhesive to the band.

* * * * *